US005336407A

United States Patent [19]

Niemeier et al.

[11] Patent Number: 5,336,407
[45] Date of Patent: Aug. 9, 1994

[54] FUEL FILTER ARRANGEMENT FOR AN INTERNAL COMBUSTION ENGINE

[75] Inventors: Gerd Niemeier, Stuttgart; Frank Schneider, Filderstadt, both of Fed. Rep. of Germany

[73] Assignee: Mercedes-Benzag, Stuttgart, Fed. Rep. of Germany

[21] Appl. No.: 94,521

[22] Filed: Jul. 19, 1993

[30] Foreign Application Priority Data

Aug. 25, 1992 [DE] Fed. Rep. of Germany ....... 4228156

[51] Int. Cl.[5] .............................................. B01D 35/02
[52] U.S. Cl. .................................... 210/249; 210/261; 210/444; 210/450; 210/452; 210/453; 210/454
[58] Field of Search ............... 210/316, 335, 339, 261, 210/445, 448, 452, 454, 249, 450, 435, 453, 444; 248/94

[56] References Cited

U.S. PATENT DOCUMENTS 2,781,909 2/1957 Thompson .......................... 210/452
5,112,476 5/1992 Cote et al. ........................... 210/316

FOREIGN PATENT DOCUMENTS 2505091 8/1976 Fed. Rep. of Germany .
3710807 10/1988 Fed. Rep. of Germany .
1190415 10/1959 France ................................ 210/335
965328 7/1964 United Kingdom .

*Primary Examiner*—Matthew O. Savage
*Attorney, Agent, or Firm*—Klaus J. Bach

[57] ABSTRACT

In a Fuel Filter arrangement for an internal combustion engine comprising a prefilter and a main filter mounted to the engine by a filter holder, the filter holder has a recess receiving the prefilter, which forms a plug-in unit removably inserted in the recess and position-locked therein.

6 Claims, 1 Drawing Sheet

FUEL FILTER ARRANGEMENT FOR AN INTERNAL COMBUSTION ENGINE

BACKGROUND OF THE INVENTION

The invention relates to a fuel filter arrangement for an internal combustion engine.

From German Patent Specification 25 05 091, a fuel filter arrangement is known which includes a curved filter mounting bracket for mounting the main filter to the engine.

From German Offenlegungsschrift 37 10 807, a fuel filter arrangement is known which has a prefilter and main filter arranged in a fuel feed pipe leading to an injection pump of an internal combustion engine. The prefilter is conventionally mounted between the fuel tank and the feed pump at a poorly accessible location within the engine compartment, e.g., beneath the induction manifold in the region of the body side frame and engine mount.

The object of the invention is to mount the preliminary filter in the engine compartment in such a way as to facilitate maintenance service.

SUMMARY OF THE INVENTION

In a fuel filter arrangement for an internal combustion engine comprising a prefilter and a main filter mounted to the engine by a filter holder, the filter holder has a recess receiving the prefilter, which forms a plug-in unit removably inserted in the recess and position-locked therein.

As a result of the special configuration of the filter holder, which is no longer used to merely mount the main filter to the engine but is at the same time a receiving element for the prefilter and thus forms a structural unit for the prefilter and the main filter, the prefilter can be serviced just as easily as the main filter, which is arranged at an easily accessible location in the upper region of the engine compartment.

DESCRIPTION OF THE PREFERRED EMBODIMENT

Figure 1:
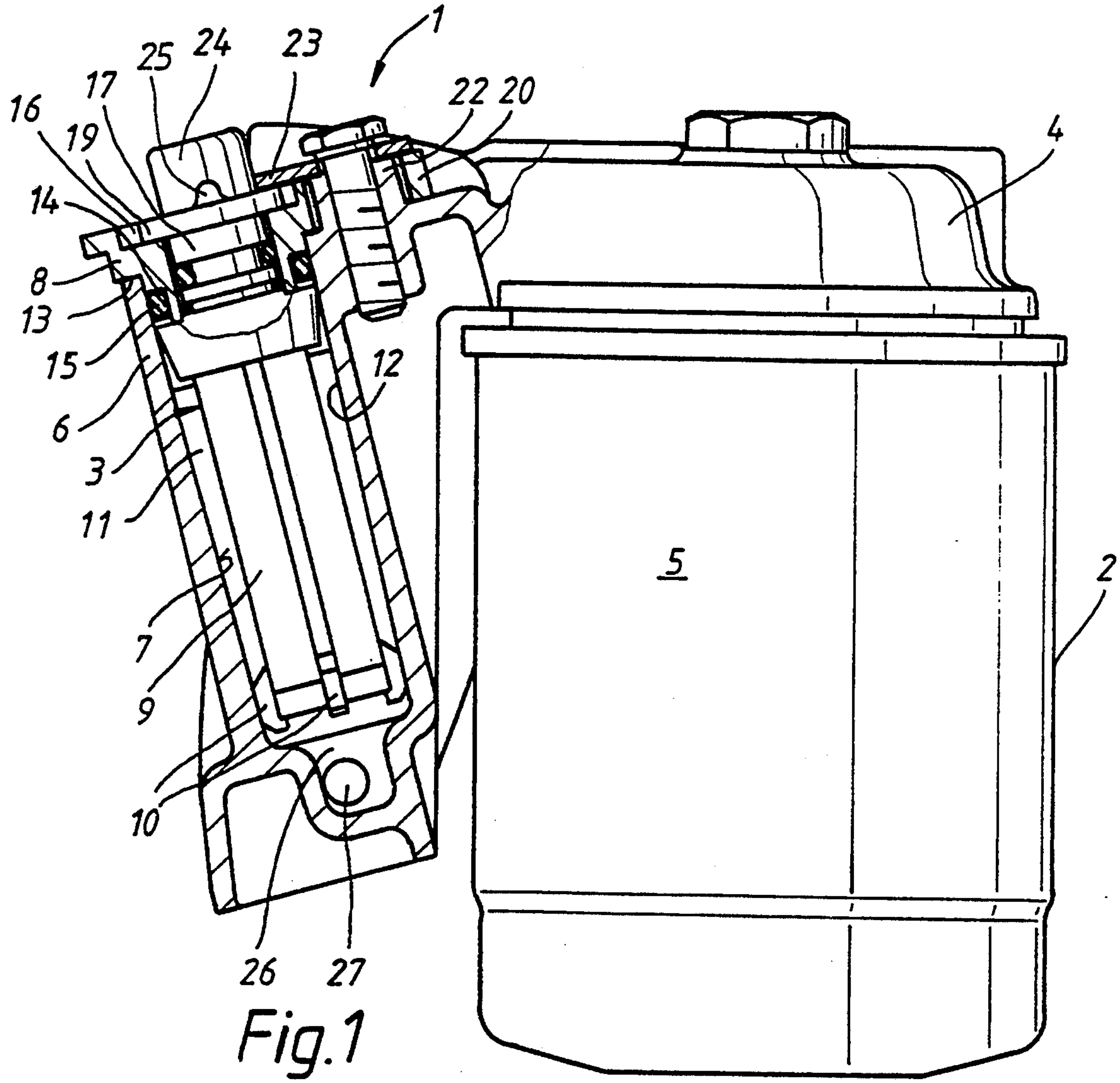
FIG. 1 shows a fuel filter arrangement with filter holder.
Figure 3:
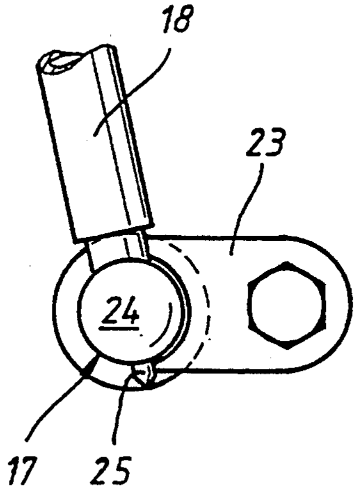
FIG. 3 is a top view of a connecting piece of the fuel feed pipe and a locking member mounted on the filter holder.
Figure 2:
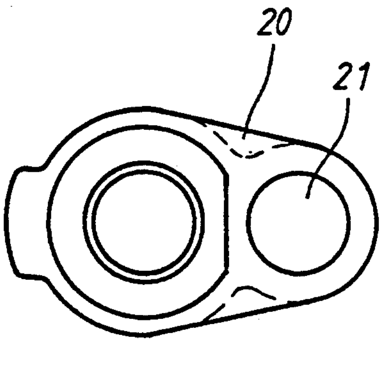
FIG. 2 is a top view of a prefilter with flange.

As shown in FIG. 1, a fuel filter arrangement for an internal combustion engine includes a main filter 2 and prefilter 3 which are combined to form a structural unit.

The main filter 2 comprises a filter head 4 and a filter box 5. The filter head 4 is integral with a filter holder 6, which extends from the filter head with a roughly rectangular angle downwardly for almost the entire length of the filter box 5 and forms an engine mounting bracket.

The filter holder 6 has a cylindrical recess 7 formed for receiving the prefilter 3, which is composed of a flanged annular element 8 from which a cylindrical, elongated strainer insert 9 extends into the recess 7.

The strainer insert 9 has at its free end spacer bars 10, which serve as guide structures and spacers to provide an annular interspace 11 between the strainer insert 9 and the inner wall 12 of the recess 7.

The shoulder 13 formed in the wall defining the cylindrical recess 7 forms a support for the annular element 8 of the prefilter 3, the annular element 8 projecting partly into the recess 7 and supporting a sealing ring 15 between its lowermost edge 14 and the inner wall 12 of the recess 7. The annular element 8 has an inner annular shoulder 16 serving as a stop structure for a connecting piece 17 of a fuel feed pipe 18 which is not shown in FIG. 1. The connecting piece is disposed on the fuel inlet side and is inserted into the annular element 8 so as to be sealed therein. An outer collar 19 which is part of the connecting piece 17 is supported on the annular shoulder 16 of the annular element 8.

At its upper end the annular element 8 has a sidewardly projecting structure 20 with an opening receiving a projection 22 which is provided on the filter holder 6 and is matched to the height of the flange 20.

The annular element 8 with flange 20, outer collar 19 of the connecting piece 17 and projection 22 form a plane on which a flat locking plate 23 is disposed, which is screwed to the filter holder 6 at the projection 22 and fixes both the prefilter 3 and the connecting piece 17 in place.

The connecting piece 17 extends essentially at a right angle with respect to the feed pipe 18, the cylindrical section 24 protruding out of the prefilter and being provided with a stop 25 engaged by the locking plate 23 which partially embraces the section 24 so as to serve also as a rotation lock for the connecting piece 17. The locking plate 23 also overlays the collar 19 to axially lock the connecting piece 17 in the annular element 8 and both in the cylindrical recess 7.

The fuel entering the filter flows via the connecting piece 17 into the prefilter 3 and flows through the strainer insert 9 from the inside thereof out into the annular space 11 and downwardly to a collecting chamber 26 from where it leaves the prefilter through a fuel outlet duct 27.

Due to the flow direction from the inside to the outside of the strainer insert 9 impurities remain within the strainer insert 9. It is thus guaranteed that during a strainer insert change no impurities will enter the fuel outlet duct 27 of the filter holder 6 which is connected to the feed pump.

What is claimed is:

1. A fuel filter arrangement for disposition in a fuel line of an internal combustion engine, said fuel filter arrangement comprising a filter mounting head for mounting said filter arrangement in an engine compartment and having opposing first and second surfaces, a main filter box having a filter media therein, means for removably mounting said filter box to the first surface of said mounting head, a filter holder with a cylindrical cavity formed integrally with said mounting head at one side thereof and extending from said first surface adjacent said main filter box, said cavity defining an opening on the second surface of said mounting head, a cylindrical strainer disposed in said cylindrical cavity and including an open end and a closed end, said strainer including at its open end a mounting plug provided with a sealing ring engaging an inner surface of said cylindrical cavity upon insertion of said strainer into said cylindrical cavity through said opening, said mounting plug having a passage in communication with the interior of said strainer for supplying fuel thereto and said filter holder having an outlet at a closed end of said cylindrical cavity opposite said opening for the discharge of prefiltered fuel therefrom, and means for locking said mounting plug with said strainer in position within said cavity.

2. A fuel filter arrangement according to claim 1, wherein said strainer mounting plug is a stepped annular element and said cylindrically strainer insert extends from said annular element into said cavity.

3. A fuel filter arrangement according to claim 2, wherein said annular element of the strainer is provided with a sidewardly projecting structure with an opening receiving a locating projection extending from the second surface to a height to match the height of the sidewardly projecting structure.

4. A fuel filter arrangement according to claim 3, wherein a connecting piece of a fuel supply pipe is inserted into the annular element of the strainer so as to be sealed therein and is locked in the annular element in the axial direction by a lock plate screwed onto said locating projection of the filter holder via a screw means.

5. A fuel filter arrangement according to claim 4, wherein the annular element has an inner annular shoulder engaged by an outer collar of said connecting piece, said outer collar being flush with a top of the annular element and said locating projection of the filter holder.

6. A fuel filter arrangement according to claim 5, wherein said lock plate is mounted onto said locating projection and overlays said outer collar for axially locking said connecting piece in said annular element and said annular element in said cylindrical cavity, said connecting piece having a fuel inlet pipe connected thereto at an angle and having a stop by which said locking plate which partially embraces the connecting piece is engaged for rotational locking of the connecting piece relative to said mounting head.

* * * * *